3,290,214
DIURETIC COMPOSITIONS CONTAINING 3'-OXO-4'-HYDROXY-4'-CYCLOPENTENO-(1',2'-16,17)-ANDROSTENE COMPOUNDS
Fritz V. Werder and Klaus Irmscher, Darmstadt, Klaus Brückner, Darmstadt-Eberstadt, Fritz Reiff and Herbert Nowak, Darmstadt, and Bruno Hampel, Nieder-Ramstadt, Germany, assignors to E. Merck Aktiengesellschaft, Darmstadt, Germany
No Drawing. Filed Mar. 19, 1964, Ser. No. 353,255
Claims priority, application Germany, Apr. 1, 1963, M 56,328
22 Claims. (Cl. 167—65)

This invention relates to novel steroids and method of synthesis therefor.

It was found that 16-methylene-17α,21-dihydroxy-20-keto-steroids of the pregnane series when treated with acids will produce reaction products which differ in their empirical formulas from the original steroid by the absence of one molecule of water. It was also discovered that the corresponding 21-ester could likewise be used as the starting material. Instead of ordinary acids, Lewis-acids can also be used. The new steroids can be esterified or etherized by known methods.

From the chemical and physical properties of the new steroids, it is deduced that their structures correspond to 3'-oxo-4'-hydroxy-4'-cyclopenteno-(1',2'-16,17)-steroids of Formula I, as follows:

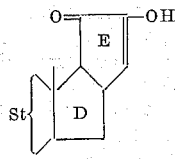

wherein St represents the steroid residue.

This structure is corroborated particularly by infrared, ultraviolet and nuclear magnetic resonance spectra.

The infrared spectra show for the probably newly formed E ring the following characteristic bands: In $CDCl_3$ at about 3480 (OH group with strong chelate formation) and 3069 cm.$^{-1}$ (hydrogen affixed to a strongly polarized double bond); in KBr at 1690–1700 (conjugated 5-ring ketone) and 1610–1620 cm.$^{-1}$ (OH-substituted C=C double band).

In the ultraviolet spectrum there is a characteristic band at 262 m$\mu$ (completely enolized α,β-diketo grouping in ring E), which in the presence of a chromophore system in ring A would, because of overlapping, be observable only as a shifting of the absorption maximum.

In the nuclear resonance spectrum (KR spectrum) there occurs at 6.4–6.5 p.p.m. a doublet with $I=3.5$ (H-atom in the 5'-position of ring E) and also a broad signal at 3.1 p.p.m. (H-atom in the 16-position of the steroid structure). This deduced structure is also corroborated by the solubility of this substance in alkalies, its ability to form esters and ethers, and also the fact that during catalytic hydrogenation of these new steroids dioles are produced.

A principal object of this invention, therefore, is to provide these novel steroids as well as their enol esters and enol ethers.

Another object is to provide a novel process for the production of these steroids.

A further object is to provide dosage unit pharmaceutical compositions based on the novel steroids of this invention.

A still further object is to provide methods of effecting therapeutic activity in mammals by administering the novel steroids of this invention.

The steroid that is to be used as the starting compound must contain an exocyclic methylene group in the 16-position, a hydroxyl group in the 17α-position, a keto group in the 20-position and a free or esterified hydroxyl group in the 21-position. Suitable esters are, e.g., those 16-methylene-17α, 21-dihydroxy-20-keto-steroid-21-acylates wherein the acyl group is a carboxylic acid, preferably a hydrocarbon carboxylic acid, with up to 18 carbon atoms, which acyl can also carry substituents. The steroids that are used as starting materials can be further substituted and/or unsaturated, it being understood, of course, that the substituted moiety does not interfere with the conversion which splits out the water molecule.

As starting substances, steroids of the following general formula are preferably employed:

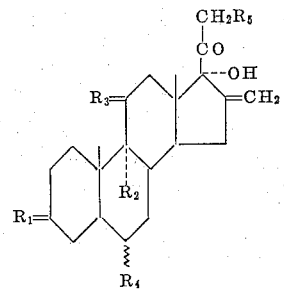

wherein
$R_1$=H, OH or =O
$R_2$=H or F
$R_3$=H, H; H, OH or =O
$R_4$=H, F, Cl or $CH_3$ and
$R_5$=a free or esterified hydroxyl group
and where in the 5-position or in the 1- and/or 4- and/or 6-position, one or more additional double bonds can occur.

As specific examples, the following steroids are advantageously used as starting materials:

16-methylene-Reichstein-substance-S
16-methylene-hydrocortisone
16-methylene-cortisone
16-methylene-prednisolone
16-methylene-prednisone
16-methylene-5-pregnene-3β,17α,21-triol-20-one
16-methylene-4,6-pregnadiene-11β,17α,21-triol-3,20-dione
9α-fluoro-16-methylene-hydrocortisone
9α-fluoro-16-methylene-cortisone
9α-fluoro-16-methylene-prednisone
6α-methyl-16-methylene-Reichstein-substance-S and also the 21-esters of these substances, especially the 21-acetates. The production of these starting compounds can, e.g., be accomplished by the methods described in Tetrahedron Letters No. 16, pages 21–32 (1960). Starting compounds that are substituted in the 6-position can for example be produced by the method described in the South African Patent 264/61, with subsequent saponification of the 17α-acetoxy group and the introduction of a 21-OH- or 21-O-acyl group by one of the methods described in Fieser & Fieser, Steroids, Reinhold Publ. Corp., New York (1959), pages 623–625.

When the 21-ester is used, it is very likely that the first step in the reaction is a saponification to the 21-alcohol, although it is also conceivable that the reaction may follow some other course in which the free alcohols do not appear as intermediate products.

For the re-arrangement reaction, any strong acid can be used, as, e.g., hydrochloric, hydrobromic, sulfuric, phosphoric, trifluoroacetic, and trichloracetic acid. By "strong acid" there is meant to be understood an acid with a $pK_a$ value lower than 3 at 25° C. in aqueous solution.

It is also possible to use equivalent compounds which under the condtions of the reaction will form acids. For example, acid chlorides such as acetyl chloride or chloracetyl chloride in an aqueous solvent will liberate HCl which would then bring about the reaction. Instead of ordinary acids, there can be used Lewis-acids such as boron trifluoride-etherate, zinc chloride or aluminium chloride.

It is practical to perform the reaction in the presence of an inert solvent, suitable solvents being for example, dioxane, chloroform, tetrahydrofuran or benzene.

The reaction can also be conducted under a wide range of temperatures and pressures. For example, the reaction can be performed at room temperature, or with moderate heating or at the boiling temperature of the solvent under sub-normal or supra-atmospheric pressures. It will be completed in from a few seconds to 20 days, depending on the reactants and the temperature. The reaction products are separated by the usual methods from the reaction mixture, e.g., by crystallization and/or chromatography.

By the method of this invention, it is generally possible to form any desired compound corresponding to the deduced Formula I. The steroid residue St is not subject to any restrictions. It can be substituted and/or be unsaturated in the most diverse places. It can also be a 19-nor-steroid residue.

Compounds corresponding to the following deduced formula or enol esters or ethers thereof are most readily obtainable.

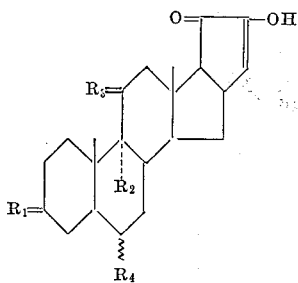

wherein $R_1$, $R_2$, $R_3$ and $R_4$ have the meanings indicated above, and where one or more double bonds can occur in the 5-position or in the 1- and/or 4- and/or 6-position.

For example, the following compounds are preferred embodiments of this invention:

3'-oxo-4'-hydroxy-4'-cyclopenteno-(1',2'-16,17)-4-androstene-3-one,

3'-oxo-4'-hydroxy-4'-cyclopenteno-(1',2'-16,17)-4-androstene-3,11-dione,

3'-oxo-4'-hydroxy-4'-cyclopenteno-(1',2'-16,17)-4-androstene-11β-ol-3-one,

3'-oxo-4'-hydroxy-4'-cyclopenteno-(1',2'-16,17)-1,4-androstadiene-3,11-dione,

3'-oxo-4'-hydroxy-4'-cyclopenteno-(1',2'-16,17)-1,4-androstadiene-11β-ol-3-one,

3'-oxo-4'-hydroxy-4'-cyclopenteno-(1',2'-16,17)-5-androstene-3β-ol,

3'-oxo-4'-hydroxy-4'-cyclopenteno-(1',2'-16,17)-4,6-androstadiene-11β-ol-3-one,

3'-oxo-4'-hydroxy-4'-cyclopenteno-(1',2'-16,17)-9α-fluoro-4-androstene-3,11-dione, 3'-oxo-4'-hydroxy-4'-cyclopenteno-(1',2'-16,17)-9α-fluoro-4-androstene-11β-ol-3-one, 3'-oxo-4'-hydroxy-4'-cyclopenteno-(1',2'-16,17)-9α-fluoro-1,4-androstadiene-3,11-dione, 3'-oxo-4'-hydroxy-4'-cyclopenteno-(1',2'-16,17)-9α-fluoro-1,4-androstadiene-11β-ol-3-one, 3'-oxo-4'-hydroxy-4'-cyclopenteno-(1',2'-16,17)-6α-fluoro-4-androstene-3-one, 3'-oxo-4'-hydroxy-4'-cyclopenteno-(1',2'-16,17)-6α-methyl-4-androstene-3-one.

The reaction products thus obtained can be esterified or etherized.

As esterifying agents, the usual acids or suitable derivatives thereof can be used, preferably those which will give physiologically compatible esters. For example, the following acids or esterifiable derivatives thereof can be used: carboxylic acids such as, e.g., acetic, propionic, trimethylacetic, caproic, palmitic, undecylenic, benzoic, hexahydrobenzoic, cyclopentyl-, cyclohexyl- or aryl-acetic and -propionic such as phenylacetic or phenylpropionic, as well as halogenated carboxylic acids such as chloracetic acid. It is also possible in some cases to produce water-soluble derivatives with dicarboxylic acids, amino acids or alkylaminocarboxylic acids or with acids of phosphorus or sulfur. In this manner it is possible to produce, e.g., succinates or the acid addition salts of aminocarboxylic acid esters as, e.g., diethylamino-acetic acid ester. Besides the acids themselves, their halides and anhydrides are also suitable for esterification, and also ketenes. For ester interchange methods, the lower alkyl esters are also suitable. If additional hydroxyl groups are present in the molecule, then these can also be esterified.

As etherizing agents, the following substances are preferably used:

Diazoalkanes, e.g., diazomethane or diazoethane, if necessary in the presence of, e.g., boron trifluoride in ether, tetrahydrofuran, dioxane or some other solvent suitable for alkylation with diazoalkanes;

Alcohols, e.g., methanol or ethanol in the presence of a strong acid such as hydrochloric or sulfuric;

Alkyl halides, e.g., methyl iodide, ethyl bromide or iodide; or

Dialkylsulfates, e.g., dimethyl or diethyl sulfate.

The alkyl portion of the ether is advantageously from 1 to 8 carbon atoms, and, if desired, can contain substituted moities.

The steroid obtained by this invention is in general first converted into its alkali derivative by treating it with, e.g., an alkali hydroxide or alcoholate, and is then reacted with an alkyl halide or dialkyl sulfate.

The new steroids and their enol esters and enol ethers have diuretic and/or anti-aldosterone action and can be used as therapeutic agents themselves, or as intermediate products for the production of therapeutically active steroids. They can be mixed with the usual pharmaceutically acceptable carriers such as organic or inorganic substances which are suitable for parenteral, enteral or topical application and which do not react with the new compounds, as, for example, water, vegetable oils, polyethylene glycol, gelatin, lactose, starch, magnesium stearate, talcum, vaseline, cholesterol, etc. For parenteral application solutions are suitable, and especially oily or watery solutions, as well as suspensions, emulsions, or implants. For enteral application, tablets or dragees can be used, while for topical application salves or cremes are suitable and can be sterilized, if necessary, or mixed with ancillary materials such as preservatives, stabilizers or wetting agents or with salts for changing the osmotic pressure or with buffer substances.

The compounds of this invention are administered in effective dosages; preferably, in dosage units of 0.5 to 100 mg.

The pharmacological activities of the novel steroids can be demonstrated in the antimineralocorticoid test on rats (cf. C. M. Kagawa et al., J. Pharmacol. Exptl. Therap., 126, 123 (1959)). In this test, the compounds show a high diuretic action and a favorable ratio of Na/K elimination.

Without further elaboration, it is believed that one skilled in the art can, using the preceding description, utilize the present invention to its fullest extent. The following preferred embodiments are, therefore, to be construed as merely illustrative, and not limitative of the remainder of the specification and claims in any way whatsoever.

EXAMPLE 1

5 g. 16-methylene-4,6-pregnadiene-11$\beta$,17$\alpha$,21-triol-3, 20-dione are dissolved in 150 ml. moist dioxane and are reacted with 1.27 g. pyridine and 2.27 g. chloroacetyl chloride. After standing two days at room temperature the reaction mixture is stirred into 1.5 liters water, the resulting precipitate filtered with suction, washed with water, and recrystallized from methanol. M.P. 284–286° C.; $(\alpha)_D^{22}$+102° in dioxane.

$\lambda_{max}$. 279–280 m$\mu$, $E_{1\,cm.}^{1\%}$ 838 in ethanol

KR (in CF$_3$COOD): 1.15; 1.50; 2.76; 2.86; 3.43(b); 4.68(b); 6.08; 6.47; 6.56; 7.02; 7.08 p.p.m. (from tetramethyl-silane (TMS)); IR (in KBr); 1604; 1616; 1694; 3510; cm.$^{-1}$.

Analysis C$_{22}$H$_{26}$O$_4$.—Calculated: 74.55% C; 7.39% H. Determined: 74.3% C; 7.5% H.

Deduced structure: 3'-oxo-4'-hydroxy-4'-cyclopenteno-(1',2'-16,17)-4,6-androstadiene-11$\beta$-ol-3-one.

EXAMPLE 2

5 g. 16-methylene-prednisolone treated as in Example 1, result in a crystalline product of M.P. 320–325° C.; $(\alpha)_D^{22}$+10° (in tetrahydrofuran).

$\lambda_{max}$. 250 m$\mu$, $E_{1\,cm.}^{1\%}$ 536

KR (in pyridine-d$_5$): 1.36; 1.59; 2.43; 2.54; 2.76(b); 3.13(b); 4.47(b); 6.22; 6.36; 6.53; 6.62; 6.67; 7.36; 7.53 p.p.m. (from TMS). IR (in KBr): 1617; 1700; 3180; 3440 cm.$^{-1}$.

Analysis C$_{22}$H$_{26}$O$_4$.—Calculated: 74.55% C; 7.39% H. Determined: 74.4% C; 7.5% H; 74.3% C; 7.6% H.

Deduced structure: 3'-oxo-4'-hydroxy-4'-cyclopenteno-(1',2'-16,17)-1,4-androstadiene-11$\beta$-ol-3-one.

2 g. of this product are dissolved in dry pyridine and are reacted with 2 g. p-toluene-sulfonic acid chloride. After standing two days at room temperature the reaction mixture is stirred into 300 ml. water, the resulting precipitate filtered with suction, washed with water, and recrystallized from acetone. The pure p-toluene sulfonate melts at 248–249° C. $(\alpha)_D^{22}$+2.5° (in chloroform);

$\lambda_{max}$. 232 m$\mu$, $E_{1\,cm.}^{1\%}$ 581 (in ethanol)

KR (in CDCl$_3$): 0.86; 1.46; 2.11; 2.29; 2.39; 2.48; 3.28(b); 4.43(b); 6.08; 6.23; 6.41; 7.23; 7.33; 7.40; 7.42; 7.45; 7.47; 7.86; 7.99 p.p.m. (from TMS). The group from 7.23 to 7.47 p.p.m. contains 4 protons.

Analysis C$_{29}$H$_{32}$O$_6$S.—Calculated: 68.49% C; 6.34% H; 6.29% S. Determined: 68.7% C; 6.3% H; 6.3% S; 68.3% C; 6.4% H; 6.4% S.

Deduced structure: 3'-oxo-4'-hydroxy-4'-cyclopenteno-(1',2'-16,17)-1,4-androstadiene-11$\beta$-ol-3 - one-4'-(p-toluene-sulfonate).

EXAMPLE 3

10 g. (16-methylene-prednisolone-21-acetate are dissolved in 300 ml. dioxane and are reacted with 100 ml. hydrochloric acid (d=1.19). The reaction mixture is boiled 5 minutes under reflux, quickly cooled, and stirred into 2.5 liters ice water. The resulting precipitate is filtered with suction, washed with water, and recrystallized from methanol. The product melts at 320–325° C. and is identical with the product of Example 2.

4 g. of this substance are dissolved in 40 ml. dry pyridine and then reacted with 12 ml. acetic anhydride. After standing 20 hours at room temperature, the reaction mixture is stirred into 400 ml. of a 5% HCl solution while being cooled with ice. The resulting precipitate is vacuum filtered, washed with water, and recrystallized from acetone. The pure acetate melts at 265° C.; $(\alpha)_D^{22}$+6° (in chloroform).

$\lambda_{max}$. 240–242 m$\mu$, $E_{1\,cm.}^{1\%}$ 571.5

KR (n CDCl$_3$): 1.06; 1.48; 2.25; 2.36; 2.47; 3.27(b); 4.43(b); 6.03; 6.18; 6.35; 7.25; 7.31; 7.36; 7.41 p.p.m. (TMS).

Analysis C$_{24}$H$_{28}$O$_5$.—Calculated: 72.71% C; 7.12% H. Determined: 72.9% C; 7.2% H.

Deduced structure: 3'-oxo-4'-hydroxy-4'-cyclopenteno-(1',2'-16,17)-1,4-androstadiene-11$\beta$ - ol-3-one - 4'-acetate.

By an analogous procedure in which propionic acid anhydride is used in pyridine, the corresponding propionic acid enol ester is obtained. M.P. 250–252° C. (acetone); $(\alpha)_D^{20}$+6.2° (chloroform);

$\lambda_{max}$. 240–241 m$\mu$, $E_{1\,cm.}^{1\%}$ 554 (ethanol)

Esterification with oenanthic acid chloride in pyridine produces the oenanthic acid enol ester. M.P. 139–140° C. (ether); $(\alpha)_D^{20}$+5.5° (chloroform);

$\lambda_{max}$. 240–241 m$\mu$ $E_{1\,cm.}^{1\%}$ 482 (ethanol)

EXAMPLE 4

10 g. 16-methylene-Reichstein-substance S–21 acetate are treated with hydrochloric acid in dioxane as in Example 3. After recrystallization from acetone, the crystals had a melting point of 257–259° C.; $(\alpha)_D^{22}$+20° (in chloroform);

$\lambda_{max}$. 243 m$\mu$, $E_{1\,cm.}^{1\%}$ 550

KR (in dimethylsulfoxide-d$_6$): 0.66; 1.14; 2.29; 2.41; 3.04(b); 5.64; 6.41; 6.46 p.p.m. (from TMS). IR (in KBr): 1612; 1643; 1698; 3100 cm.$^{-1}$. IR (1.5% in CDCl$_3$): 3032; 3069; 3480 cm.$^{-1}$.

Analysis C$_{22}$H$_{28}$O$_3$.—Calculated: 77.61% C; 8.29% H. Determined: 77.4% C; 8.5% H.

Deduced structure: 3'-oxo-4'-hydroxy-4'-cyclopenteno-(1',2'-16,17)-4-androstene-3-one.

EXAMPLE 5

5 g. 16-methylene-Reichstein-substance S, are treated as in Example 1. The product is the same as in Example 4 and has a M.P. of 257–259° C.

EXAMPLE 6

A solution of 4.8 g. 9$\alpha$-fluoro-16-methylene-prednisolone in 640 cc. moist dioxane are reacted while being cooled with 2.64 cc. pyridine and a solution of 3.02 g. chloroacetyl chloride in 40 cc. dioxane. After standing 3 days at room temperature, 7 liters water are added drop-by-drop to the reaction mixture with agitation. The precipitate is separated, washed thoroughly with water, and dried. The aqueous mother liquor is extracted several times with chloroform. The combined chloroform extracts are washed with water, concentrated, and evaporated to dryness in a vacuum. A crystalline residue remains, which is recrystallized from methanol together with the separated precipitate. M.P. 320–323° C.; $(\alpha)_D^{22}$+6° (in tetrahydrofuran).

$\lambda_{max}$. 243–244 m$\mu$, $E_{1\,cm.}^{1\%}$ 499

Analysis C$_{22}$H$_{25}$FO$_4$.—Calculated: 70.95% C; 6.77% H; 5.10% F. Determined: 71.3% C; 7.0% H; 5.3% F.

Deduced structure: 3'-oxo-4'-hydroxy-4'-cyclopenteno-(1',2'-16,17)-9$\alpha$-fluoro-1,4-androstadiene-11$\beta$-ol-3-one.

The acetyl derivative produced by analogy to Example 3 melts at 291–293° C.; $(\alpha)_D^{22}+10°$ (in chloroform);

$\lambda_{max}.$ 238 m$\mu$; $E_{1\,cm.}^{1\%}$ 550 (in ethanol)

IR (in KBr): 1597/1603; 1630; 1652; 1708; 1772 cm.$^{-1}$.

Deduced structure: 3'-oxo-4'-hydroxy-4'-cyclopenteno-(1',2'-16,17) - 1,4,9$\alpha$ - fluoro-androstadiene-11$\beta$-ol-3-one-4'-acetate.

EXAMPLE 7

10 g. 16 - methylene - 1,4 - pregnadiene - 17$\alpha$,21 - diol-3,11,20-trione-21-acetate are dissolved in 300 cc. dioxane and after an addition of 100 cc. of 48% hydrobromic acid are boiled 5 minutes under reflux. The reaction mixture is stirred into 2.5 liters ice water, the resulting precipitate filtered with suction, washed well with water, and dried. The crude product is reacted in the usual manner with acetic anhydride in pyridine at room temperature and the acetate thus obtained is recrystallized from acetone. M.P. 242–243° C.; $(\alpha)_D^{22}+76°$ (in chloroform);

$\lambda_{max}.$ 237 m$\mu$; $E_{1\,cm.}^{1\%}$ 645 (in ethanol)

IR (in KBr): 1598; 1617; 1655; 1698; 1720; 1777 cm.$^{-1}$.

Analysis $C_{24}H_{26}O_5$.—Calculated: 73.08% C; 6.64% H. Determined: 73:2% C; 6.8% H.

Deduced structure: 3'-oxo-4'-hydroxy-4'-cyclopenteno-(1',2'-16,17)-1,4-androstadiene-3,11-dione-4'-acetate.

EXAMPLE 8

10 g. 16-methylene-5-pregnene-3$\beta$,17$\alpha$,21-triol-20-one-21 acetate are dissolved in 300 ml. dioxane and after an addition of 100 cc. of 48% hydrobromic acid are boiled 5 minutes under reflux. The reaction mixture is stirred into 2.5 liters ice water and the resulting precipitate filtered with suction, washed with water, and after being dried, is recrystallized from acetone. M.P. 271–272° C. $(\alpha)_D^{22}-160°$ (in dioxane).

$\lambda_{max}.$ 262 m$\mu$; $E_{1\,cm.}^{1\%}$ 210

KR (in pyridine-d$_5$): 0.93; 1.08; 2.54; 2.66; 2.76; 3.17(b); 3.91(b); 5.52; 6.69; 6.75 p.p.m. (from TMS). IR (in KBr): 1612: 1665/1690; 3260 cm.$^{-1}$.

Analysis $C_{22}H_{30}O_3$.—Calculated: 77.16% C; 8.83% H. Determined: 76.7% C; 9.0% H.

Deduced structure: 3'-oxo-4'-hydroxy-4'-cyclopenteno-(1',2'-16,17)-5-androstene-3$\beta$-ol.

EXAMPLE 9

To a solution of 1.3 g. sodium in 600 ml. ethanol are added 10 g. of the product obtained in Example 2. The solution is heated to boiling and 6.76 g. ethyl bromide are added with stirring. The reaction mixture is kept boiling 6 hours under reflux with stirring and is then evaporated down. The residue is dissolved in chloroform, the chloroform solution thoroughly washed out with water, and evaporated in a vacuum. After repeated recrystallization of the residue from ether, the ethyl-enol-ether melts at 275–276° C; $(\alpha)_D^{22}$ 60.4° (in chloroform);

$\lambda_{max}.$ 249 m$\mu$; $E_{1\,cm.}^{1\%}$ 514 (in ethanol)

IR (in KBR) 1610; 1658; 1700 cm.$^{-1}$; KR: 1.04; 1.26; 1.38; 1.48; 2.33; 2.44; 3.13(b); 3.74; 3.86; 3.97; 4.09; 4.46(b); 6.05; 6.18; 6.22; 6.35; 6.39; 7.28; 7.45 p.p.m. (from TMS).

Analysis $C_{24}H_{30}O_4$.—Calculated: 75.36% C; 7.91% H. Determined: 75.2% C; 8.3 H.

Deduced structure: 4'-ethoxy-3'-oxy-4'-cyclopenteno-(1',2'-16,17)-1,4-androstadiene-11$\beta$-ol-3-one.

By analogy the following can be prepared.

With isopropyl bromide, the corresponding isopropyl-enol-ether. M.P. 227–228° C. (from ether).

$(\alpha)_D^{20}+28.8°$ (in chloroform);

$\lambda_{max}.$ 247–249 m$\mu$; $E_{1\,cm.}^{1\%}$ 459 (in ethanol)

With cyclopentyl bromide, the corresponding cyclopentylenol-ether. M.P. 244–245° C. (from ether); $(\alpha)_D^{20}+30.6°$ (in chloroform);

$\lambda_{max}.$ 247–250 m$\mu$; $E_{1\,cm.}^{1\%}$ 420 (in ethanol)

From the product of Example 4 with ethyl bromide in sodium ethylate solution, the corresponding ethyl-enol-ether. M.P. 182–184° C. (from ether), $(\alpha)_D^{20}+48.3°$ (in chloroform);

$\lambda_{max}.$ 243 m$\mu$, $E_{1\,cm.}^{1\%}$ 557 (ethanol)

Deduced structure: 4'-ethoxy-3'-oxo-4'-cyclopenteno-(1',2'-16,17)-4-androstene-3-one.

From the product of Example 8 with ethyl bromide, the corresponding ethyl-enol-ether. M.P. 202–203° (from ether); $(\alpha)_D^{20}-111.7°$ (in chloroform);

$\lambda_{max}.$ 259-260 m$\mu$, $E_{1\,cm.}^{1\%}$ 168 (in ethanol)

Deduced structure: 4'-ethoxy-3'-oxo-4'-cyclopenteno-(1',2'-16,17)-5-androstene-3$\beta$-ol.

EXAMPLE 10

5.6 g. 16-methylene-hydrocortisone-21-acetate are dissolved in 168 ml. dioxane and reacted with 56 ml. hydrochloric acid (density=1.19). The mixture is boiled 5 minutes under reflux, quickly cooled, and stirred into 1.5 liters ice water. The resulting precipitate is filtered with suction, washed with water, then with methanol, and recrystallized from acetone. M.P. 301–303° C.;

$(\alpha)_D^{22}+44.2°$ (in tetrahydrofuran);

$\lambda_{max}.$ 243–244 m$\mu$, $E_{1\,cm.}^{1\%}$ 540 (ethanol)

Analysis $C_{22}H_{28}O_4$.—Calculated: 74.13% C; 7.92% H. Determined: 73.8% C; 8.1% H.

Deduced structure: 3'-oxo-4'-hydroxy-4'-cyclopenteno-(1',2'-16,17)-4-androstene-11$\alpha$-ol-3-one.

By reaction with ethyl bromide in sodium ethylate solution the corresponding ethyl-enol-ether is obtained. M.P. 218–219° (acetone); $(\alpha)_D^{20}+89.7°$ (in chloroform), $\lambda_{max}.$ 244 m$\mu$, $E_{1\,cm.}^{1\%}$ 510 (ethanol)

Analysis $C_{24}H_{32}O_4$.—Calculated: 74.97% C; 8.39% H. Determined: 75.1% C; 8.7% H.

Deduced structure: 4'-ethoxy-3'-oxo-4'-cyclopenteno-(1',2'-16,17)-4-androstene-11$\beta$-ol-3-one.

EXAMPLE 11

33 g. 6$\alpha$ - methyl - 16 - methylene-4-pregnene-17$\alpha$,21-diol - 3,20 - dione - 21 - acetate (M.P. 197–198° C.; $(\alpha)_D+38.6°$ (in chloroform)) are dissolved in 990 ml. dioxane, and after an addition of 330 ml. hydrochloric acid (density=1.19) are boiled under reflux five minutes. The mixture is quickly cooled and is stirred into 10 liters ice water. The separated precipitate is washed with water, dried, and recrystallized from acetone. M.P. 242° C.; $(\alpha)_D^{20}\pm0°$ (in chloroform);

$\lambda_{max}.$ 243 m$\mu$, $E_{1\,cm.}^{1\%}=530$ (ethanol)

Analysis $C_{23}H_{30}O_3$.—Calculated: 77.93% C; 8.53% H. Determined: 77.7% C; 8.6% H; 78.1% C; 8.7% H.

Deduced structure: 3'-oxo-4'-hydroxy-4'-cyclopenteno-(1',2'-16,17)-6$\alpha$-methyl-4-androstene-3-one.

The following examples relate to preferred pharmaceutical compositions:

I—Tablets

Each tablet contains:                                     Mg.
  3' - oxo-4'-hydroxy-4'-cyclopenteno-(1',2'-16,
    17)-4-androstene-3-one _____      50
  Lactose _____    120
  Corn starch _____     30
  Talc _____      2

II—Dragees (coated tablets)

| | Kg. |
|---|---|
| 3' - oxo-4'-hydroxy-4'-cyclopenteno-(1',2'-16,17)-1,4-androstadiene-3-one | 0.250 |
| Lactose | 0.600 |
| Corn starch | 0.150 |

The steroid is micronized so that the average particle diameter is about 1μ and is then mixed with the other ingredients and stamped into 10.000 cores. The cores are then coated, according to conventional methods, with a mixture of wheat starch, sugar, talc and tragacanth. The dosage unit is 25 mg./coated tablet.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. A process for the production of novel steroids, which process comprises reacting a starting steroid selected from the group consisting of 16-methylene-17α,21-dihydroxy-20-keto-steroid and a 21-ester thereof, with an acid selected from the group consisting of a strong hydrogen acid and a Lewis-acid, to form water and a novel steroid, said steroid being characterized by the following properties:

infrared bands: in $CDCl_3$ at about 3480 and 3069 cm.$^{-1}$; in KBr 1690–1700 and 1610–1620 cm.$^{-1}$;
ultraviolet bands at 262 mμ;
in the nuclear resonance spectrum at 6.4–6.5 p.p.m. a doublet with $I=3.5$, and being of the formula:

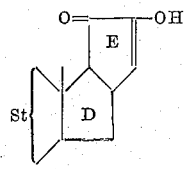

wherein St represents the A, B, and C rings of a steroid residue selected from the group consisting of pregnanes and 19-nor analogs thereof.

2. The process of claim 1, wherein the starting steroid is selected from the group consisting of a compound of the formula

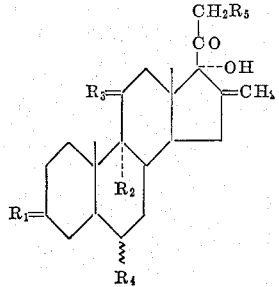

wherein
$R_1$ is selected from the group consisting of H, OH and =O;
$R_2$ is selected from the group consisting of H, and F;
$R_3$ is selected from the group consisting of H, H; H, OH and =O;
$R_4$ is selected from the group consisting of H, F, Cl and $CH_3$; and
$R_5$ is selected from the group consisting of a free and esterified hydroxyl group, and the $\Delta^5$, $\Delta^1$, $\Delta^4$, $\Delta^6$, $\Delta^{1,4}$, $\Delta^{1,6}$, $\Delta^{4,6}$, and $\Delta^{1,4,6}$ derivatives thereof.

3. A compound selected from the group consisting of

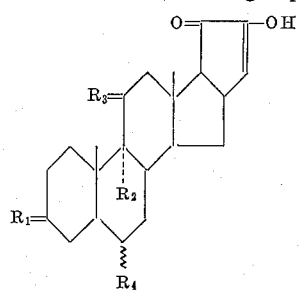

wherein
$R_1$ is selected from the group consisting of H, OH and =O;
$R_2$ is selected from the group consisting of H and F;
$R_3$ is selected from the group consisting of H, H; OH and =O;
$R_4$ is selected from the group consisting of H, F, Cl and $CH_3$;

and the $\Delta^5$, $\Delta^1$, $\Delta^4$, $\Delta^6$, $\Delta^{1,4}$, $\Delta^{1,6}$, and $\Delta^{1,4,6}$ derivatives thereof, and 19-nor-analogs thereof.

4. A compound selected from the group consisting of a 4' enol ester and a 4' enol ether of a compound as defined in claim 3.

5. 3' - oxo-4'-hydroxy-4'-cyclopenteno-(1',2'-16,17)-4-androstene-3-one.

6. 3' - oxo-4'-hydroxy-4'-cyclopento-(1',2'-16,17)-1,4-androstadiene-11β-ol-3-one.

7. 3' - oxo - 4'-hydroxy-4'-cyclopenteno-(1',2'-16,17)-9α-fluoro-1,4-androstadiene-11β-ol-3-one.

8. 3' - oxo - 4' - hydroxy-4'-cyclopenteno-(1',2'-16,17)-4,6-androstadiene-11β-ol-3-one.

9. 3' - oxo - 4'-hydroxy-4'-cyclopenteno-(1',2'-16,17)-4,6-androstadiene-3,11-dione.

10. 3' - oxo - 4'-hydroxy-4'-cyclopenteno-(1',2'-16,17)-5-androstene-3β-ol.

11. 4' - ethoxy - 3'-oxo-4'-cyclopenteno-(1',2'-16,17)-1,4-androstadiene-11β-ol-3-one.

12. 3' - oxo - 4-hydroxy-4-cyclopenteno-(1',2'-16,17)-1,4-androstadiene-11β-ol-3-one-4'-acetate.

13. 3' - oxo - 4'-hydroxy-4'-cyclopenteno-(1',2'-16,17)-1,4-androstadiene-11β-ol-3-one-4'-propionate.

14. 3' - oxo - 4'-hydroxy-4'-cyclopenteno-(1',2'-16,17)-1,4-androstadiene-11β-ol-ol-3-one-4'-oneanthate.

15. 3' - oxo-4'-hydroxy-4'-cyclopenteno-(1',2'-16,17)-4-androstene-11β-ol-3-one.

16. 3' - oxo - 4'-hydroxy-4'-cyclopenteno-(1',2'-16,17)-6α-methyl-4-androstene-3-one.

17. A pharmaceutical composition in dosage unit form comprising a pharmaceutical carrier and 0.5 to 100 mg. of a steroid as defined in claim 3.

18. A phermaceutical composition in dosage unit form comprising a pharmaceutical carrier and 0.5 to 100 mg. of a steroid as defined in claim 4.

19. A pharmaceutical composition in dosage unit form comprising a pharmaceutical carrier and 0.5 to 100 mg. of 3' - oxo - 4' - hydroxy-4'-cyclopenteno-(1',2'-16,17)-4-androstene-3-one.

20. A pharmaceutical composition in dosage unit form comprising a pharmaceutical carrier and 0.5 to 100 mg. of 3' - oxo - 4'-hydroxy-4'-cyclopenteno-(1',2'-16,17)-1,4-androstadiene-11β-ol-3-one.

21. A pharmaceutical composition in dosage unit form comprisnig a pharmaceutical carrier and 0.5 to 100 mg. of 3' - oxo - 4'-hydroxy-4'-cyclopenteno-(1',2'-16,17)-9α-fluoro-1,4-androstadiene-11β-ol-3-one.

22. 3' - oxo - 4'-hydroxy-4'-cyclopenteno-(1',2'-16,17)-1,4-androstadiene-3,11-dione-4'-acetate.

No references cited.

LEWIS GOTTS, *Primary Examiner.*

ELBERT L. ROBERTS, *Examiner.*